Aug. 13, 1963 L. S. WILLIAMS 3,100,600
CHART READING MECHANISM
Original Filed Oct. 17, 1956 7 Sheets-Sheet 1
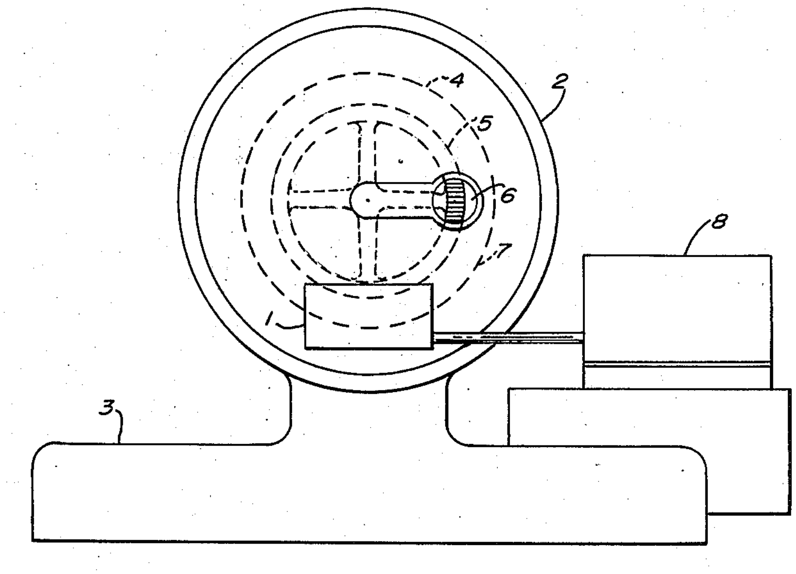
Fig. I
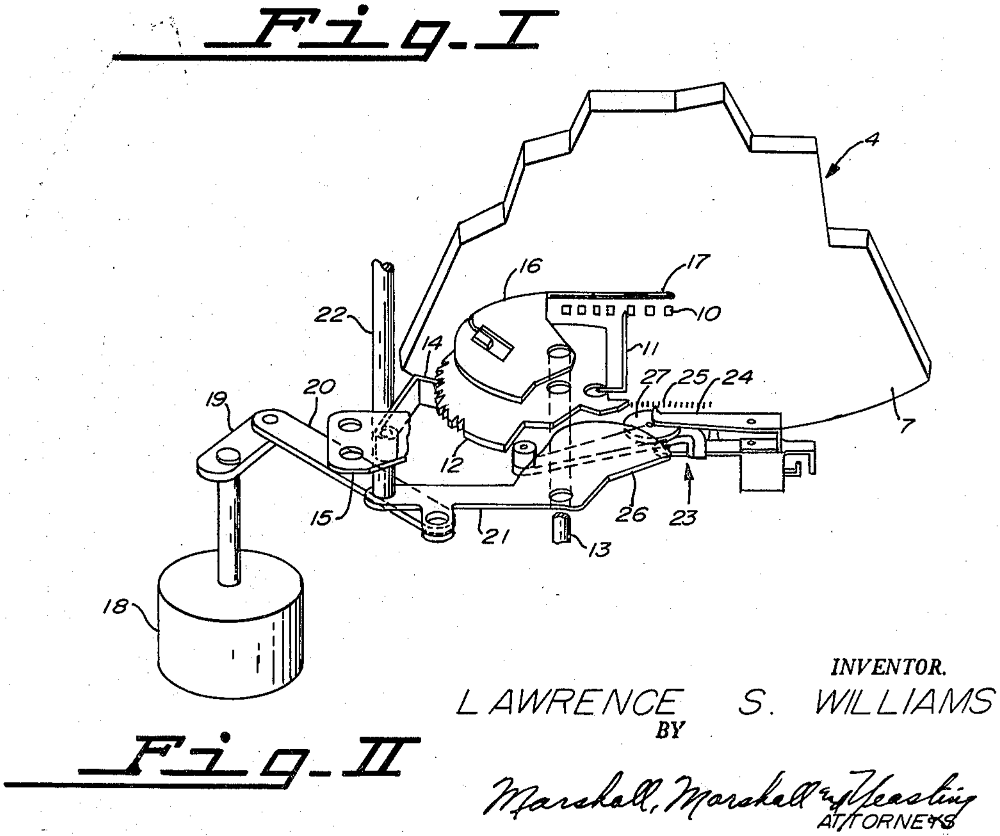
Fig. II
INVENTOR.
LAWRENCE S. WILLIAMS
BY
Marshall, Marshall & Yeasting
ATTORNEYS

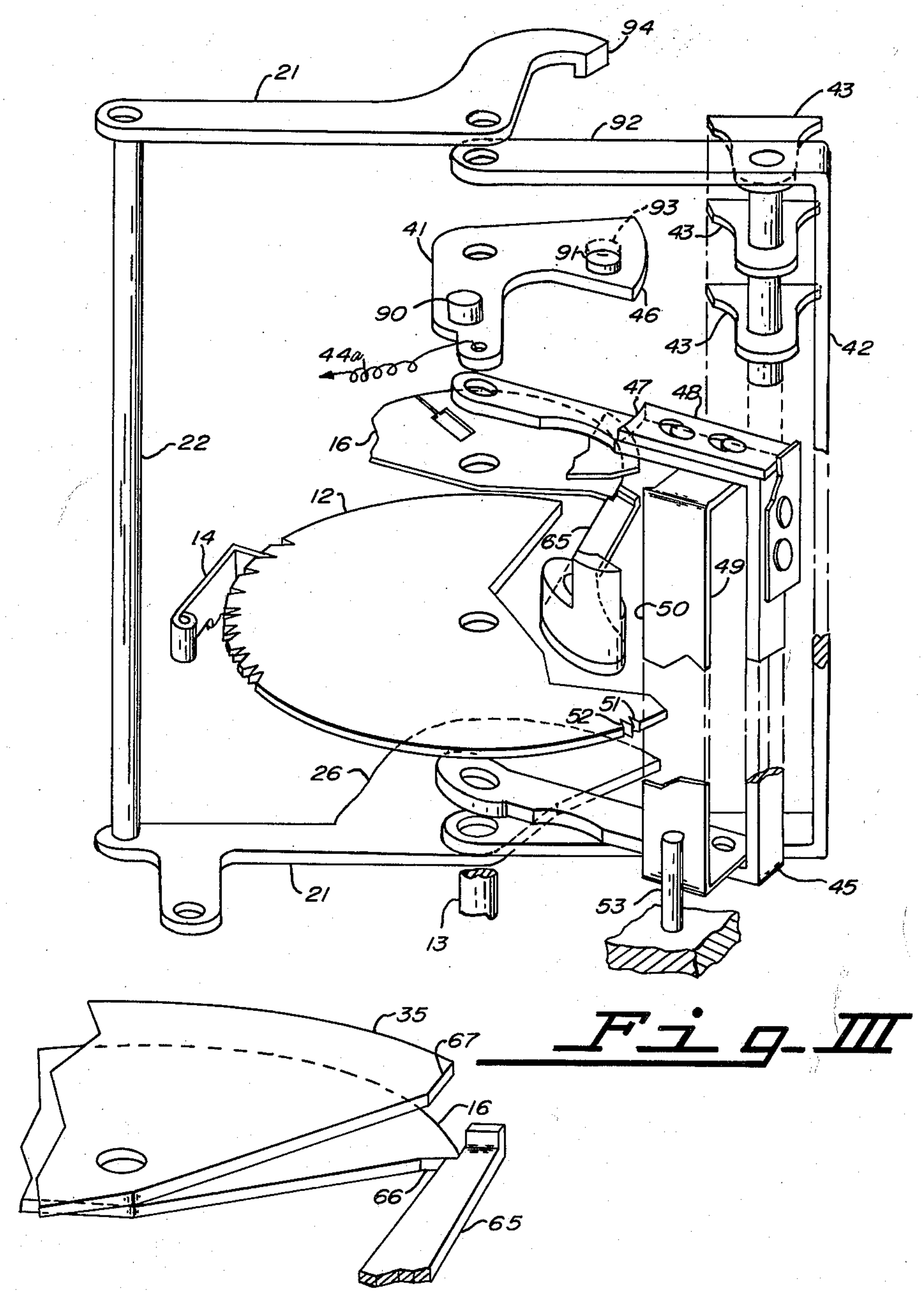
Fig-III, Fig-IV
INVENTOR.
LAWRENCE S. WILLIAMS
BY
Marshall, Marshall & Yeasting
ATTORNEYS Aug. 13, 1963 L. S. WILLIAMS 3,100,600
CHART READING MECHANISM
Original Filed Oct. 17, 1956 7 Sheets-Sheet 3
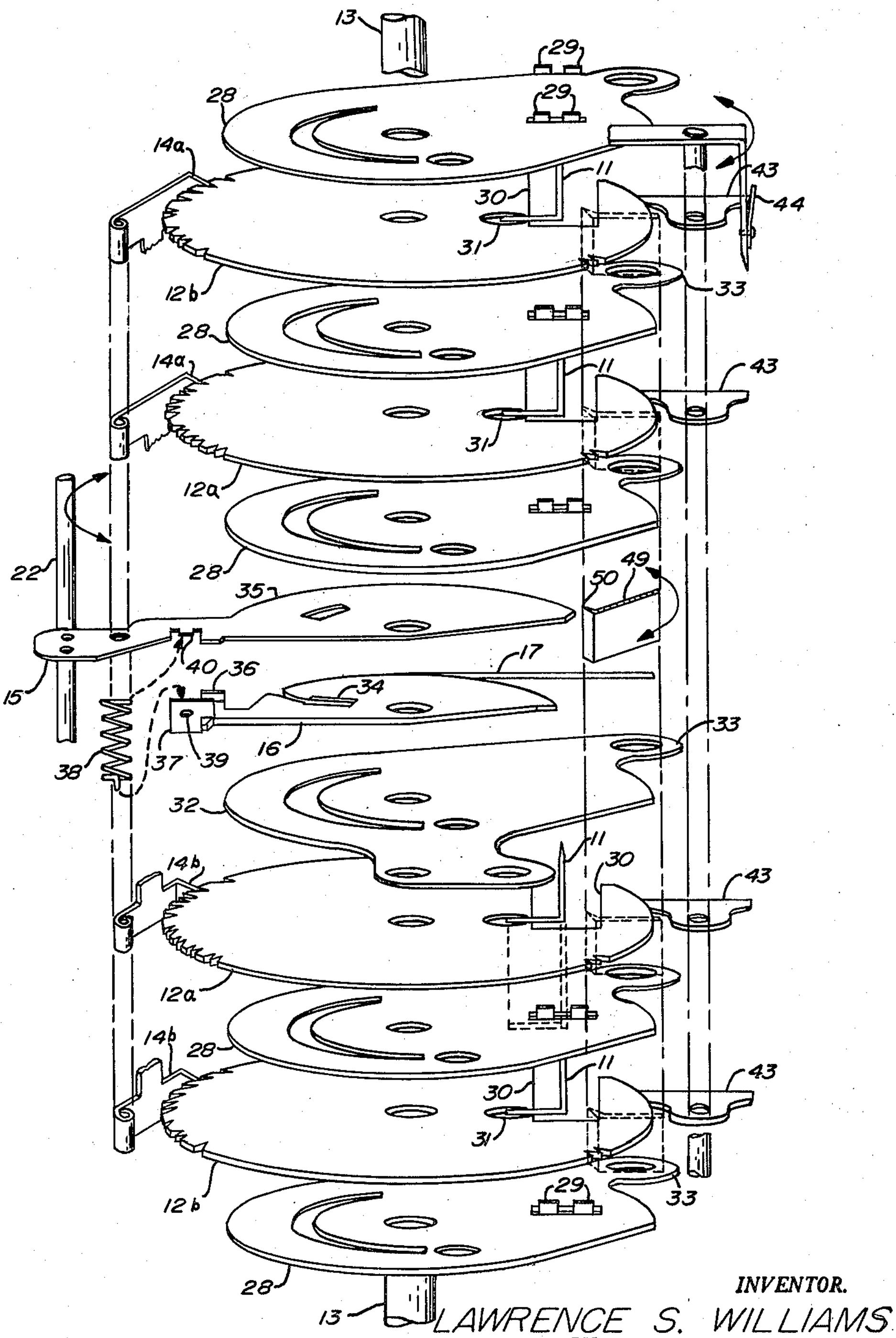
Fig-V
INVENTOR.
LAWRENCE S. WILLIAMS
BY
Marshall, Marshall and Yeasting
ATTORNEYS CHART READING MECHANISM
Original Filed Oct. 17, 1956 7 Sheets-Sheet 4
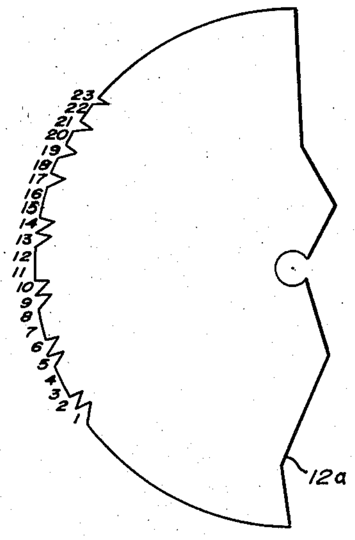
Fig. VI
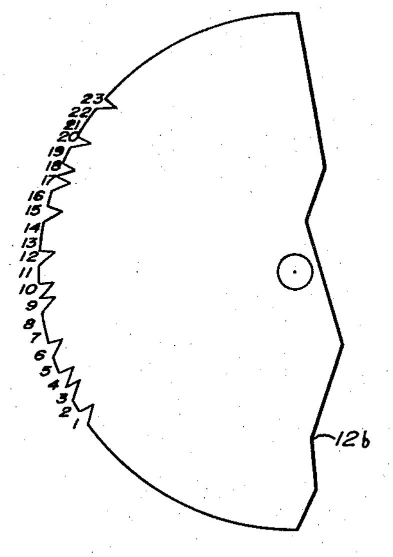
Fig. VII
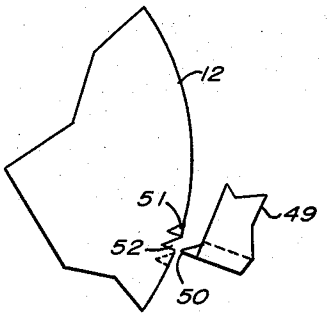
Fig. XIII
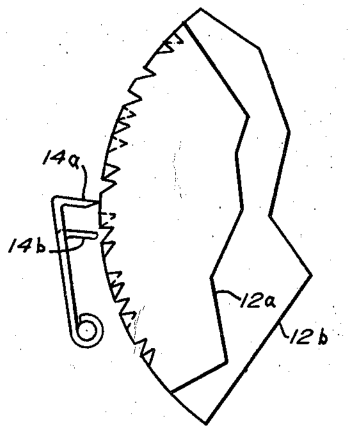
Fig. XIV
INVENTOR.
LAWRENCE S. WILLIAMS
BY
Marshall, Marshall and Yeasting
ATTORNEYS Aug. 13, 1963 L. S. WILLIAMS 3,100,600
CHART READING MECHANISM
Original Filed Oct. 17, 1956 7 Sheets-Sheet 5
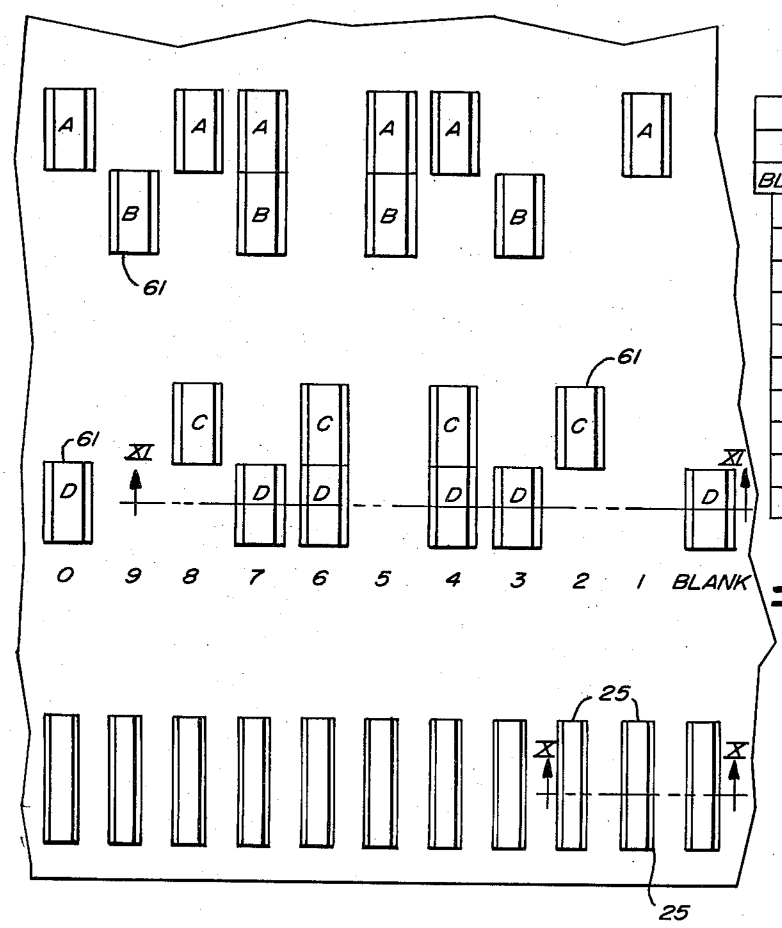
| CODE | A | B | C | D |
|---|---|---|---|---|
| BLANK | | | | D |
| 0 | A | | | D |
| 1 | A | | | |
| 2 | | | C | |
| 3 | | B | | D |
| 4 | A | | C | D |
| 5 | A | B | | |
| 6 | | | C | D |
| 7 | A | B | | D |
| 8 | A | | C | |
| 9 | | B | | |
Fig. VIII
Fig. IX
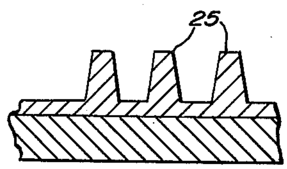
Fig. X
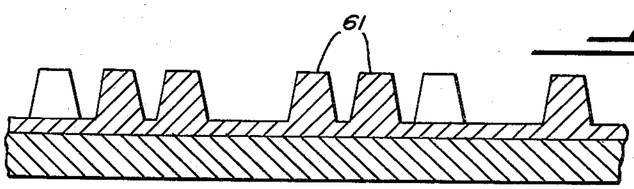
Fig. XI
INVENTOR.
LAWRENCE S. WILLIAMS
BY
Marshall, Marshall & Yeasting
ATTORNEYS Aug. 13, 1963 L. S. WILLIAMS 3,100,600
CHART READING MECHANISM
Original Filed Oct. 17, 1956 7 Sheets-Sheet 6
Fig. XII
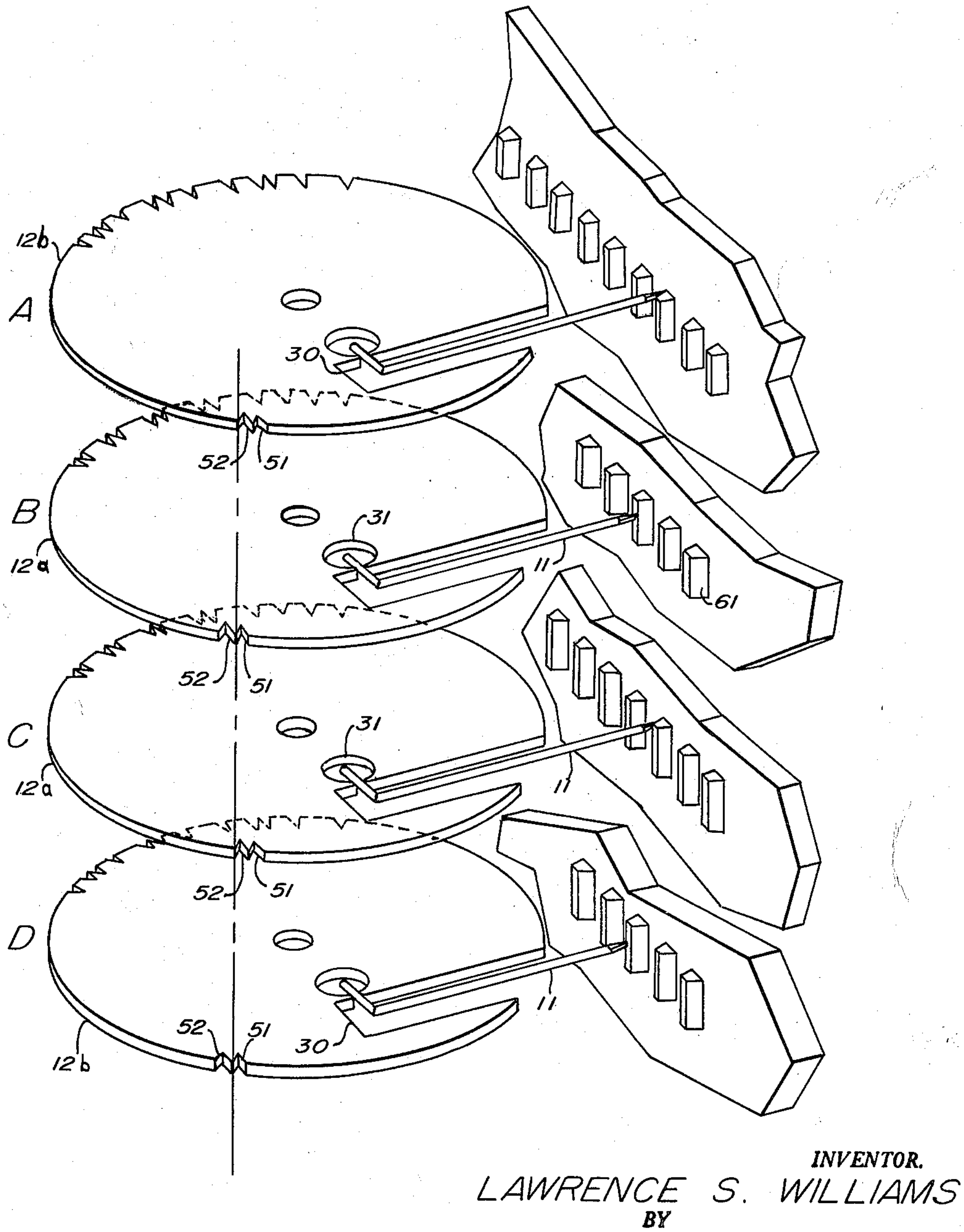
INVENTOR.
LAWRENCE S. WILLIAMS
BY
Marshall, Marshall and Yeasting
ATTORNEYS CHART READING MECHANISM
Original Filed Oct. 17, 1956
7 Sheets-Sheet 7
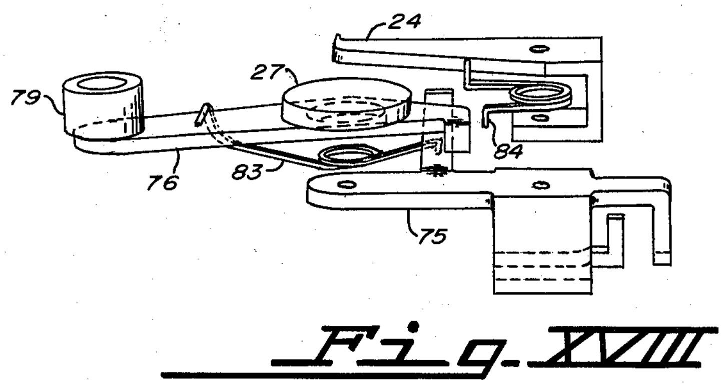
Fig. XVIII
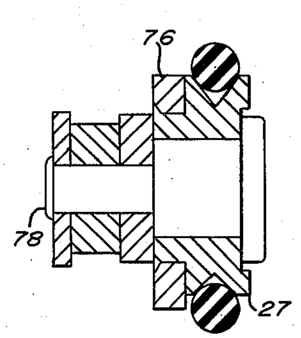
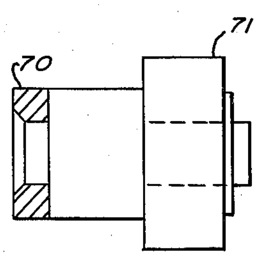
Fig. XVI Fig. XVII
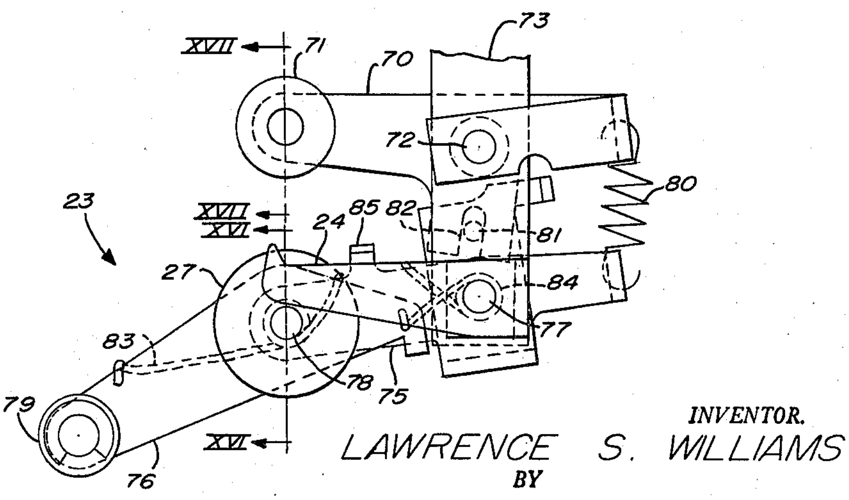
Fig. XV
INVENTOR.
LAWRENCE S. WILLIAMS
BY
Marshall, Marshall & Yeasting
ATTORNEYS United States Patent Office 3,100,600
Patented Aug. 13, 1963

3,100,600
CHART READING MECHANISM
Lawrence S. Williams, Toledo, Ohio, assignor to Toledo Scale Corporation, Toledo, Ohio, a corporation of Ohio
Continuation of application Ser. No. 616,517, Oct. 17, 1956. This application Nov. 21, 1961, Ser. No. 155,239
6 Claims. (Cl. 235—1)

This invention relates to apparatus for reading charts and converting such readings into digital information or a digital display.

One of the problems involved in the use of weighing scales is that of securing accurate printed records of the weights of loads being weighed on the scale. It is desirable that such printed records should be accurate to the least chart graduation that can be visibly read, should be taken in a minimum length of time and should not interfere any more than is absolutely necessary with the free movement of the weighing mechanism. It is furthermore desirable that the weight of the weighing scale indicating mechanism that is driven by the load counterbalancing members be as small as possible so as not to interfere with rapid response of the weighing mechanism to changes in load. It is further desirable that the recording mechanism that reads the chart of the weighing scale be able to operate with a minimum of interference with the chart.

Previously known printing or recording arrangements for use with weighing scales fail to provide one or more of the above described features. For example, many of the weighing scale printing devices operated on the so-called "stepped wheel" principle wherein a series of annular disks were rotated by the weighing mechanism said disks being notched on their peripheries with notches indicative of the corresponding graduations. Thus one annular disk may have a series of stepped notches, one for every ten graduations, there being ten steps in each notch indicative of the units value of the weight being recorded. The next annular disk might have a notch for each hundred graduations the notch being divided into ten steps one step for each ten graduations. Likewise, another disk would be divided to give one step of a notch for each one hundred graduations and having a range of a thousand graduations. While such annular disk type of notched wheels were quite accurate as regards the ability of the sensing mechanism to deliver accurate indications they nevertheless were of such weight as to seriously interfere with the response time of the weighing mechanism. Attempts to reduce the weight of the parts resulted in members so fragile as to be easily damaged and therefore not commercially acceptable.

The principal object of this invention is to provide an improved chart sensing mechanism.

A further object of the invention is to provide a chart reading mechanism that may cooperate with a molded chart thereby keeping the weight of the parts a minimum.

A still further object is to provide a motor operated chart reading device in which the members contacting the chart are frictionally urged against the chart with only sufficient force to ensure reliable operation and in which the indicating or printing mechanism is driven by much stronger members so as to secure reliable operation of the heavier parts of the assembly.

Another object is to provide a permutation type of assembly in which each of the permutation members assumes one of two positions depending upon the graduation of the chart being read and in which the permutation members are arranged in groups to control the positioning of the indicating device.

These and more specific objects and advantages are obtained from the chart reading mechanism constructed according to the invention.

According to the invention, the weighing scale is provided with a chart having graduations each comprising a coded combination of raised and depressed surfaces and a reading mechanism comprising a permutation disk assembly having a plurality of disks for each denominational order in the result which disks are set by momentary contact with the chart surfaces and are arranged to be sensed by and control the movement of a member the travel of which corresponds to the decimal digit value of the graduation being sensed. Means are provided for simultaneously urging all of the disks in a direction such that associated feeler pins contact the chart graduations and then immediately retracting the disks without disturbing their relative positions before the final selection is made by a pawl sweeping over the permutation disks.

A preferred form of the invention is illustrated in the accompanying drawings.

In the drawings:

FIGURE I is a front elevation showing a weighing scale indicating mechanism and illustrating one position of a reading mechanism applied thereto.

FIGURE II is a simplified diagrammatic illustration of the cooperation of essential parts of the reading and indicating assembly.

FIGURE III is a simplified diametric view of a portion of the reading mechanism illustrating the positions of some of the elements included in such mechanism.

FIGURE IV is a fragmentary enlarged view of a portion of the mechanism illustrating the structure for changing certain indications to eliminate zeros ahead of the first significant figure in the recorded result.

FIGURE V is an exploded diametric view showing the permutation members and spacers associated with one order of the reading device.

FIGURE VI is a plan view of one of the permutation disks employed in the device to show one pattern of notches.

FIGURE VII is a plan view of another of the permutation disks showing another pattern of notches which are used in conjunction with disks such as that shown in FIGURE VI.

FIGURE VIII is a chart showing the coded combination of raised and depressed surfaces for each character to be printed in one decade of the reading and recording device.

FIGURE IX is an elevational view of a fragment of the chart showing the general arrangement of raised and depressed portions of the chart comprising the various graduations to be sensed by the reading device.

FIGURE X is a fragmentary section taken along the line X—X of FIGURE IX.

FIGURE XI is a fragmentary section taken along the line XI—XI of FIGURE IX.

FIGURE XII is an isometric view of a set of permutation disks and pins showing their cooperation with the chart.

FIGURE XIII is a fragmentary sectional view showing the cooperation of certain notches of the permutation disks with a common pawl used to retract the disks while maintaining the disks in the relative positions assumed when sensing the chart.

FIGURE XIV is a fragmentary plan view showing the cooperation of a sensing pawl with notches provided in the peripheries of the permutation disks shown in FIGURES VI and VII.

FIGURE XV is a plan view of a chart locating device that is employed to arrest movement of the chart and locate it with its graduations centered along the line of the reading mechanism.

FIGURE XVI is a fragmentary elevation taken along the line XVI—XVI of FIGURE XV.

FIGURE XVIII is a fragmentary elevation taken along the line XVII—XVII of FIGURE XV.

FIGURE XVIII is an exploded diametric view of the principal parts included in the chart locating or centering device.

These specific figures and the accompanying description are intended merely to illustrate the invention and not to impose limitations on its scope.

In the accompanying drawings a preferred form of the invention applicable for use in connection with weighing scales is illustrated. As applied to a weighing scale, the chart reading device, i.e., sensing and code translating mechanism, is enclosed within a housing 1 mounted on the front of an indicating mechanism case 2 that is erected from a frame 3 surmounting the cabinet of a weighing scale. The force from loads being weighed is transmitted to load counterbalancing and indicating mechanism contained within the case 2 and arranged to rotate an annular-disk chart 4 through increments of angle that are proportional to the increments of load applied to the load receiver of the scale. The chart 4 carries a row of indicia 5 that may be viewed through a magnifier 6 mounted in the front wall of the case 2. The chart 4 also carries concentric rows of coded indicia on an annular marginal area 7 that are arranged to cooperate with the sensing and code translating mechanism that is enclosed within the housing 1.

The sensing and code translating mechanism in the housing 1 may be mechanically connected to a printing mechanism 8 mounted adjacent to or on the frame 3 of the weighing scale.

In general, the improved reading device comprises the disk chart having coded indicia or graduations each consisting of a series of raised and depressed areas, i.e., raised indicia. These are sensed by a series of pins connected to permutation disks which are frictionally driven toward the chart until stopped by the chart graduations and then retracted, without disturbing their relative positions, and locked in a fixed position. The friction drive permits overrun and provides low and constant forces between the chart and the pins and freedom from the requirement of a precise chart plane. Once the disks are locked a sensing pawl scans or sweeps over a portion of the periphery of a group of disks to find aligned notches corresponding to the graduation of the chart that was sensed. The sensing pawl is spring urged and is connected to a printing device or indicating wheel and the indication set up by such wheel is determined by the travel of the pawl before it finds an aligned set of notches. There are four pins and associated permutation disks for each place in the decimal system and a complete device to record to three places consists of 12 such pins and disks. To extend the range to the ordinary chart combinations employed in weighing scales requires another order making sixteen such pins and disks in all. The sensing, permutation and selecting mechanisms are integrated about a common axis of rotation for the sake of simplicity and low friction.

In order to eliminate the possibility of error should a pin slide off a raised portion of a graduation because the chart has stopped halfway between two graduations a centering device, operating ahead of the pin movement, is employed to shift the chart from any half graduation position to the next full graduation so that a pin always firmly engages either the crest of a raised portion of a chart graduation or accurately enters a depressed portion.

In the structure shown in FIGURE II the chart 4 carries raised portions 10 constituting part of the coded graduations or coded indicia. The raised portions 10 or the spaces between them are engaged by pins 11, of which one is shown, the pins in turn being individually connected to permutation disks 12 again only one being shown. The disks 12 are journaled on a vertical axle 13 and are individually driven by mechanism shown in FIGURE III to advance the pins 11 toward the chart and retract them from the chart.

As soon as the pins are retracted and the disks located in their relative positions according to the positions assumed when the pins were in contact with the chart, a pawl 14 that cooperates with the peripheries of a group of four of the permutation disks 12 and carried on the end of an arm 15 is caused to scan or search the peripheries of the group of disks 12 until it finds aligned notches and is arrested by engagement therewith. A cable drive disk 16 coupled to the arm 15 is connected through a cable 17 to printing or indicating mechanism enclosed within the housing 8. The pawl arm 15 and pawl 14 are driven counterclockwise as seen in FIGURE II by a motor 18 that is connected through a crank 19 and connecting rod 20 to a frame 21 including an upright bar 22 and are returned in the clockwise direction by a return spring in the printer or indicating wheel that applies tension through the cable 17. Immediately prior to the counterclockwise movement of the frame 21 and the permutation disks 12, the chart 4 is centered or located by a centering device 23 that has a finger 24 arranged to engage in spaces between a row of teeth 25 molded in the marginal area of the chart 4. This centering device is driven by a cam 26 forming part of the frame 21. It is further arranged with a rubber tired wheel 27 which engages a smooth portion of the chart 4 and turning slightly in a clockwise direction, as seen in the figure, moves the chart, if not properly engaged with the finger 24, in a counterclockwise direction so as to tend to drag the teeth 25 past the finger 24 until the tip of the finger falls into the space between a pair of adjacent teeth. The centering device 23 is illustrated in detail in FIGURES XV to XVIII inclusive.

Referring now to FIGURES III and V and in particular to FIGURE V the permutation disks 12, four in number for each decade, are shown separated by spacers 28 of which five are shown one for the next decade being included in this figure. The pins 11, each of which is L-shape in plan, each rests on the next lower spacer 28 and is guided by notches between turn-up ears 29 formed on such spacer that fit into U-shaped slots 30 cut into the permutation disk 12. The short end of each of the L-shaped pins 11 is engaged in a narrow bight or opening leading from the slot 30 into a drilled hole 31 in the disk 12. The spacers 28 and an intermediate spacer 32 have drilled ears 33 that receive a support rod which serves to prevent the spacers from rotating and holds them in spaced relation so that the permutation disks 12 are freely rotatable therebetween. The cable 17 appearing near the middle of FIGURE V is trained over the circular edge of the cable drive disk 16 and has a thimble or other enlargement on its end anchored in an enlarged slot 34 cut in the disk 16. Immediately above the disk 16 is a pawl carrier 35 which includes the arm 15. The pawl carrier 35 and the cable drive disk 16 are connected together by up-turned ears 36 and 37 on a radially extending arm of disk 16 that loosely embrace a portion of the arm 15 of the pawl carrier 35. A small coil spring 38 having one end inserted in a hole 39 of the ear 37 and its other end sleeved over a short tongue 40 of the arm 15 of the pawl carrier 35 urges the pawl carrier clockwise with respect to the cable drive disk 16. The spring 38 is weak compared to the tension force exerted by the cable 17 so that it is normally compressed to its solid height thus accurately locating the cable drive disk 16 with respect to the pawl carrier 35.

The pawl 14 carried on the end of the arm 15 is show in FIGURE V as broken into four parts to correspond to the exploded spacing of the permutation disks 12. As may be seen from FIGURE XIV the sensing pawl 14 has two fingers 14*a* and 14*b* arranged to engage notches in the peripheries of the permutation disks 12. The notches are in particular patterns so that at one position only in the travel of the pawl along the peripheries of the disks can it find aligned notches. The particular position varies according to the combination of relative positions of the disks which in turn are determined by the chart graduation previously sensed by the pins 11. The particular patterns for the permutation disks are shown in FIGURES VI and VII.

The sensing of the chart by the pins 11 occurs near the end of the counterclockwise stroke of the frame 21, as seen in FIGURES II and III when it fractionally drives the permutation disks counterclockwise until each disk 12 is individually stopped as its pin 11 engages the chart. The drive is through a lost motion connection 41 between the frame 21 and a brake shoe frame 42 that carries a series of brake shoes 43 one bearing on each of the permutation disks 12. The frame 21, lost motion connection 41 and brake shoe frame 42 are journaled on the axle 13, the lost motion connection 41 being juxtaposed to upper arms one on the frame 21 and one on the brake shoe frame 42 as shown in FIG. III. The frame 21, through its upper arm, when it moves counterclockwise as seen in FIG. III so engages the lost motion connection 41 that they move counterclockwise as one, the lost motion connection eventually engaging the upper arm of the brake shoe frame 42 driving it toward the chart 4 as described hereinafter in detail. As may be seen near the upper portion of FIGURE V, the brake shoe 43 is held against the periphery of the permutation disk 12 by a spring 44 so as to maintain moderate frictional engagement between the brake shoe and the disk. During the counterclockwise motion of the brake shoe frame 42 the brake shoes drive the permutation disks 12 counterclockwise a distance determined by whether or not the sensing pins 11 strike raised portions or depressed portions of the coded graduations on the chart 4.

On the return motion of the frame 21 the lost motion connection 41, which is urged clockwise by a spring 44*a*, returns a common pawl bail 45 in a clockwise direction. The drive is through a friction connection comprising an arcuate surface 46 of the lost motion connection 41 and a mating concave surface 47 of a resiliently held slider 48 mounted on top of the common pawl bail 45. The common pawl bail 45 carries a common pawl 49 having a sharp edge 50 arranged to engage notches 51 or 52 in each of the permutation disks 12.

It will be understood that the brake shoe frame 42, the common pawl bail 45, and the lost motion connection 41 are journaled on the axle 13 so as to move concentric with respect to the peripheries of the permutation disks 12. Whether the sharp edge 50 of the common pawl 49 engages the notch 51 or the notch 52 of a particular permutation disk 12 depends upon the position of the disk relative to the others. At the start of the return motion of the common pawl bail 45 the sharp edge 50 is riding on the peripheries of the disks 12 and as it approaches the notches it is supported on the smooth peripheries of those disks which were not advanced the full distance because of the engagement between the corresponding pin 11 and the raised portion of the chart and it thus skips the notches 51 in the advanced disks and drops into the first notches 51 of the retarded disks and notches 52 of the advanced disks. As the sharp edge 50 catches in the notches it drives the permutation disks clockwise until the motion of the common pawl bail 45 and common pawl 49 is interrupted by engagement of the pawl 49 with a fixed stop 53 to lock the permutation disks 12 in position.

The spacing between the notches 51 and 52 corresponds approximately to the difference in travel of a permutation disk depending upon whether its pin found a crest or a depressed section in the corresponding coded chart graduation. The relative position of the notches 51 and 52 are shown in clearer detail in FIGURE XII. As shown in this figure the first and third disks have advanced their full amount since their pins 11 engaged depressed portions of the corresponding chart graduations. At the same time the second and fourth disks did not advance the full amount since their pins engaged the crest of the chart graduations. Thus in the alignment, as indicated by the broken line, the first notches 51 of the second and fourth disks are in alignment with the second notches 52 of the first and third disks.

On the continued return motion of the frame 21 the selector pawl arm 15 carrying the pawl 14 follows the frame bar 22 with the pawl 14 riding over the notched periphery of the permutation disks 12. As was mentioned before the notches are arranged in patterns so that for each particular combination of relative positions of the four permutation disks of a set the pawl can find but one position at which it can enter the notches. When it finds such position it stops the pawl carrier 35 thereby stopping the movement of the cable 17 and leaving the indicating mechanism in the corresponding position. The frame bar 22, however, continues on to the end of its stroke.

By offsetting the pawl fingers 14*a* and 14*b* by the peripheral distance of two spaces it is possible to devise notch combinations or patterns so that only two different patterns are required for the four permutation disks there being two disks of a first pattern and two of a second pattern. These patterns are illustrated in FIGURES VI and VII. The permutation disks 12 of the pattern shown in FIGURE VI are marked 12*a* and those of the pattern shown in FIGURE VII are marked 12*b*. The pawl finger 14*a* cooperates with the upper two permutation disks as shown in FIGURE V which consists of one disk with pattern 12*a* and one disk with the pattern for 12*b*. Likewise, the shorter finger 14*b* cooperates with two disks 12*a* and 12*b* shown near the bottom portion of FIGURE V.

Referring to FIGURE VI it may be noted that the pattern of notches extending over approximately 20 percent of the circumference fo the disk 12*a* is divided into 23 portions with notches appearing in portions 1, 2, 5, 6, 9, 10, 13, 14, 17, 19, 21, and 23 while the other disk shown in FIGURE VII is also divided into 23 sections with the notches in this disk in sections 1, 3, 4, 6, 9, 10, 12, 15, 17, 18, 20 and 23. When these disks are assembled in their relative positions shown in FIGURES V and XII, that is, with a disk 12*b* in the top or A position, a disk 12*a* in the second or B position, another of the 12*a* disks in the C position, and one of the 12*b* disks in the bottom or D position, and the disks are positioned according to the code set forth in FIGURE VIII the pawl will find aligned notches so as to stop its movement in each of 11 possible positions which correspond to the odd number positions starting with the third section of the disk shown in FIGURE VI.

If the pawl fails to find an aligned notch it travels to the end of its possible stroke and the printing or indicating mechanism prints or displays an "E" indicating an error. A next to last position, with only the permutation disk in the D position actuated, is arranged to show a blank in the printing or indicating mechanism and this condition is employed for zeros ahead of the first significant figure. That is, if a 1000 pound capacity scale is to indicate 10 pounds it will not print or indicate the zero in the hundreds place but will merely show a 1 in the tens place and a zero in the units place.

A greatly enlarged section of chart is illustrated in FIGURE IX and sections thereof in FIGURES X and XI. As shown in FIGURE IX the chart comprises a first series of uniformly spaced raised graduations constituting the teeth 25 arranged along the outer margin of the chart. These cooperate with the centering device 23 which is illustrated in detail in FIGURES XV to XVIII inclusive. Radially inward from the teeth 25 are the sets of coded graduations 61 preferably arranged in three or four bands of which only a portion of one band is shown.

The rectangular areas, which are rectangularly shaped to conserve space in the direction of chart rotation, i.e., the surfaces to be sensed are narrower in the direction of chart rotation than in the radial direction, represent the raised portions of the coded graduations which, as may be seen in FIGURE XI, are formed in the general shape of rack teeth and extend a substantial distance, perhaps in the order of .030 to .040 inch, above the surface of the chart and have a width at their base approximately equal to their height. The particular section of chart selected for illustration in FIGURE IX is the first ten units of the units band of graduations modified to show a blank in the zero position. Ordinarily the units zero would be printed in the zero load condition to indicate the condition of the scale. The raised portions of the coded graduations of the chart as shown in FIGURE IX correspond to the code shown in FIGURE VIII.

The chart is preferably made by molding a layer of a synthetic resin molding compound onto a metal backing sheet in the same manner as phonograph records are made.

The cooperation between the sensing needles or pins 11, which are wedge-shaped to present a narrowed width at the chart face without excessive slenderness, and the chart coded graduations 61 is illustrated in FIGURE XII wherein the coded graduations 61 are not shown in any particular combination. The top and third selector pins 11 are shown engaging the space between the projected or raised portions of the graduations while the second and fourth engage the crests of the graduation portions.

Additional load offsetting mechanism is sometimes used on weighing scales in addition to the automatic load counterbalancing mechanism that operates the chart 4. When such additional mechanism is in use it is desirable when the load offset by the automatic mechanism is small that the scale print the zeros even though it would normally indicate or print blank spots for the low capacity readings, that is the blanks ahead of the first significant figure. To accomplish this the blank and zero indications in the chart of FIGURE VIII are adjacent each other and the scanning movement of the pawl 14 over the notches of the disks 12 takes place in descending order starting with the nine and working through to the zero and blank. When such additional load counterbalancing mechanism is used it is arranged to operate a finger 65, FIGURE IV, that cooperates with a corner 66 of the cable drive disk 16 so as to arrest the motion of the cable drive disk in the zero position rather than allowing it to go to the blank position when only the D permutation disk has been operated. If an error has been made, however, such that the pawl 14 does not stop the pawl carrier 35 in the blank position it over travels under the force of the spring 38 until its beveled corner 67 strikes a turned up lip of the finger 65 and cams the finger 65 out of engagement with the corner 66 of the cable drive disk 16. This releases the disk 16 and the indication immediately goes to "E."

The chart centering or locating device 23 is illustrated in greater detail in FIGURES XV to XVIII inclusive. The function of this device is to advance or retard the chart 4 the small distance it may be required to align the graduations and insure that the selector pins 11 will either squarely meet the crest of the coded chart graduations 61 or will fall into the spaces between such graduations. In any digital reading device such as this it is necessary that each of the several pins accurately find its correct position because errors of certain of the pins may result in reading errors of a very substantial magnitude. For example, an error on one pin which may be in one of the higher decades of the reading device could cause an error of at least 10 percent of full scale and possibly 90 percent of full scale. As was indicated in connection with FIGURE II the locating device 23 includes the sharpened finger 24 that is adapted to engage the spaces between teeth 25 in the marginal area 7 of the chart 4. The finger 24 is part of a scissors arrangement comprising a backup arm 70 carrying a roller 71 journaled on an axle 72 forming part of a bracket 73 attached to the frame of the scale. The finger 24 is part of an articulated assembly that also includes a front scissors arm 75, and a roller arm 76. The articulated assembly is primarily journaled on an axle or stud 77 and the entire centering assembly 23 is positioned relative to the chart 4 so that the marginal area of the chart may be caught between the rubber tired roller 27 carried on the roller arm 76 and the backup roller 71 carried on the arm 70 as these members are brought together. The roller arm 76 is journaled on a short stud 78 forming part of the front scissors arm 75. Also a cam follower roller 79 is carried on the end of the roller arm 76 and is adapted to engage the edge of the cam 26 of the drive frame 21. A spring 80 normally holds the scissors arrangement in open condition as is illustrated in FIGURE XV. Furthermore, the front scissors arm 75 drives in equal amounts, the back scissors arm or backup arm 70 by means of a pin 81 set in an L-shaped extension of the front scissors arm 75 in position to engage a slot 82 in the backup arm 70. Suitable ears are turned up from the various members to limit the pivotal or rotational movement of each with respect to the member on which it is supported.

In addition to the spring 80, a spring 83 is coiled about the stud 78 with one end engaging the roller arm 76 and the other engaging the front scissors arm 75 with the tension in the spring urging the roller arm 76 counterclockwise as shown in FIGURE XV. The spring 83 is made relatively stiff so that it can overcome the tension in the spring 80 and close the scissors before there is any relative movement between the roller arm 76 and the front scissors arm 75.

Another spring 84 coiled about the stud 77 and engaging the finger 24 urges the finger toward the chart at all times. The travel of the finger is limited by an ear 85 of the front scissors arm 75 at a point where the tip of the finger 24 extends a short distance beyond the periphery of the rubber tired roller 27.

When a reading of the chart is to be made and the motor 18 energized the first portion of the travel of the drive frame 21, cam 26 and the roller 79 drives the roller arm 76 and the front scissors arm 75 toward the chart without bending the joint at the stud 78. The backup roller 71 on the end of the arm 70 approaches the chart from behind to prevent further deflection of the chart away from the finger 24 and rubber tired roller 27. As the arm is advanced further the leading tip of the finger 24 engages the teeth 25 of the chart 4 and either enters the space between the pair of teeth or rests on the crest of a tooth. The pressure exerted at this point deflects the finger 24 back against the tension of the spring 84 permitting the rubber tired roller 27 to engage the margin of the chart. Since the chart is backed up by the roller 71 it cannot deflect back away from the rubber tired roller 27 but rather is held there and as the cam 26 continues to drive the cam roller 79 forward the arm 76 turns on the stud 78 so that the rubber tired roller 27 tends to pull the chart toward the right, as seen in FIGURE XV, a small distance. The friction drive between the roller 27 and the chart is not enough to dislodge the tip of the finger 24 if it were engaged between two teeth but is sufficient to move the chart so that the tip of the finger 24 slides off the crest of a tooth and into the space between adjacent teeth 25. Thus regardless of whether the chart is stopped with a tooth 25 or a space between the teeth 25 opposite the tip of the finger 24 it will eventually be positioned with the tip of the finger 24 in the space between two of the teeth 25.

The timing of the remainder of the structure during the taking of the reading is taken from the main drive 21 and the sequence of events is that as the frame 21 is driven counterclockwise as seen in FIGURES II, III, and V the upright bar 22 of the frame 21 engages the ends of the pawl carriers 15 picking them up from whatever position they may have stopped during the previous operation. As the pawl carriers 15 are driven on around counterclockwise by motion of the drive frame 21 it eventually, through its upper arm, engages an upwardly directed stud 90 of the lost motion connection 41. The lost motion connection 41, through its arcuate surface engaging the concave portion 47, drives the common pawl frame 45 counterclockwise to release the permutation disks 12. Continued motion of the drive frame 21 and lost motion connection 41 brings the connection 41 around until another upwardly directed stud 91 engages a top arm 92 of the brake shoe frame 42 and drives it toward the chart 4, that is counterclockwise as seen in FIGURE III. The brake shoe frame 42 drags the permutation disks with it in a counterclockwise direction until their motion is arrested by engagement of the pins 11 with the coded chart graduations 61. The actual travel of the pins 11 of the permutation disks 12 is much greater than the depths of the spaces between the graduations 61. However, regardless of the total travel of pins 11 as a group the disks are arranged relative to each other according to whether the pins dropped into the spaces between the coded chart graduations or onto the crests.

At this point in the cycle the motion of the drive frame 21 reverses and as it backs off, the lost motion connection 41 being urged clockwise by the spring 44*a* follows and through its frictional engagement with the common pawl frame 45 drives that frame clockwise. The sharp edge 50 of the common pawl 49 now slides along the smooth periphery of the permutation disks 12 until it finds the aligned ones of the notches 51 or 52. The pawl then drops into the aligned notches and the continued motion of the lost motion connection drives the disks 12 clockwise until the common pawl strikes the stop 53. The frictional drive from the lost motion connection 41 is supplemented by a downwardly directed stud 93 of the lost motion connection 41 which engages the back side of the upper arm of the common pawl frame 45 to apply sufficient force to the frame to hold it firmly against the stop 53.

As the drive frame 21 returns in the clockwise direction the pawl carriers 15 follow it with the pawls 14 searching along the notched peripheries of the permutation disks 12. As each pawl finally finds its aligned notch it stops or arrests the motion of the corresponding pawl carrier and thus through its connection to the indicating mechanism registers an indication of that particular position. The final increment of travel of the drive frame 21 in the clockwise direction brings a down turned ear 94 on the end of the upper arm of the frame 21 into contact with the back side of the upper arm 92 of the brake shoe frame 42 so as to positively drive the brake shoes clockwise on the permutation disks 12 in preparation for the next cycle of operation.

This particular combination, by driving all of the permutation disks toward the chart through a distance large compared to the depths of the coded graduations and then retracting the disks without disturbing their relative position, permits the use of extremely small graduations on the chart and hence a large number of such graduations without requiring correspondingly accurate alignment of the chart as a whole. Thus in this assembly the chart may run out or wobble a distance several times of the depth of the chart graduations without affecting the accuracy of the readings.

Various modifications may be made in the structure disclosed without departing from the principle of employing the relative position of the permutation disks during a sensing operation rather than their absolute position with respect to the frame and thus securing a highly precise, rugged, reliable chart reading mechanism.

This application is a continuation of U.S. application Serial No. 616,517 filed October 17, 1956 in the name of Lawrence S. Williams and now abandoned.

Having described the invention, I claim:

1. A chart reading device comprising, in combination, a positionable chart having raised surfaces representing coded indicia, a plurality of sensing pins adapted to sense the chart, a plurality of movable permutation members individually connected to the pins, each of the members having a smooth peripheral section and a first and second notch spaced in the direction of movement of the member, a frame movable along the periphery of the members, friction means individually connecting each member to the frame whereby movement of the frame in a first direction moves the pins toward the chart, a pawl operatively connected to the frame and adapted to engage the notches to oppose movement of the members in a direction to engage the pins with the chart, and means for moving the frame in said first direction until the pawl is disengaged from the notches and engaged with the smooth peripheral section of at least one member as its pin engages the chart indicia and arrests the movement of the member and for moving the frame in a return direction during which the pawl leaves the smooth section and selectively engages the notches according to the arrested position of the respective members to move the members to retracted positions that vary according to the arrested positions.

2. A chart reading device comprising, in combination, a positionable chart having coded graduations each comprising a series of raised surfaces, a plurality of sensing pins adapted to engage the coded graduations, a plurality of movable permutation members individually connected to the pins, each of the members having a smooth peripheral section and a first and second notch spaced in the direction of movement of the member, a frame movable along the periphery of the members, yieldable means so individually connecting each member to the frame that movement of the frame in a first direction moves the pins toward the chart, a pawl operatively connected to the frame and adapted to engage the notches to oppose movement of the member in a direction to engage the pins with the chart, and means for moving the frame in said first direction until the pawl is disengaged from the notches and engaged with the smooth peripheral section of at least one member as its pin engages the chart graduations and arrests the movement of the member causing relative movement of the members with respect to each other in accordance with a pattern derived from the coded graduations and for moving the frame in a return direction during which the pawl leaves the smooth section and selectively engages the notches according to the arrested position of the members to move the members to retracted positions that vary according to the arrested positions.

3. A chart reading device comprising, in combination, a positionable chart having coded graduations each comprising a series of raised surfaces, a plurality of relatively movable permutation members each having an aperture and a slot communicating with the periphery thereof and rotatable about an axis adjacent the chart, feeler pins disposed in said slots and having driven ends pivotally engaged in sliding fits in the permutation member apertures and free ends for engaging the chart, means for guiding the free ends of the pins, spacers in spaced relation one on either side of the permutation members with the permutation members freely rotatable therebetween, the spacers being closely spaced to retain the driven ends of th pins in the permutation member apertures and slots, means for individually rotating the permutation members about the axis so that the free ends of the feeler pins engage the graduations causing relative movement of the permutation members with respect to each other in accordance with a pattern derived from the coded graduations and for disengaging the feeler pins from the chart by retracting the permutation members in rotative movement about the axis without disturbing their positions relative to each other, and means for scanning the relative positions of the permutation members after they have been retracted.

4. A chart reading device comprising, in combination, a positionable coded indicia-bearing chart, four sensing pins adapted to engage the indicia, a first and second pair of positionable permutation members individually connected to the pins, the first pair having a series of notches according to a first pattern and the second pair having a series of notches according to a second and different pattern, means for driving the members to positions fixed by engagement of the pins with the chart, whereby each of the permutation members occupies one of two positions, said means retracting the permutation members without disturbing their positions relative to each other, and pawl means for scanning the relative positions of the retracted permutation members, said pawl means including a pair of fingers offset from each other along the periphery of the permutation members and each finger being arranged to cooperate respectively with the notches of the pair of members of the first pattern and with the notches of the pair of members of the second pattern.

5. A chart reading device comprising, in combination, a positionable chart having raised surfaces representing coded indicia, a plurality of sensing pins adapted to sense the chart, a plurality of movable permutation members individually connected to the pins, the pins and the members being rotatable about a common axis, a frame movable along the periphery of the members, yieldable means so individually connecting each member to the frame that movement of the frame in a first direction rotates the pins about the axis toward the chart, means for moving the frame in said first direction until the pins engage the chart causing relative movement of the members with respect to each other in accordance with a pattern derived from the coded indicia and for moving the frame in a return direction, and means operatively connected to the yieldable means for movement therewith and operable upon said movement of the frame in the return direction for positively locking and retracting the members in rotative movement about the axis without disturbing their positions relative to each other.

6. A chart reading device according to claim 5 wherein means are provided which are rotatable about the common axis for scanning the relative positions of the retracted members.

References Cited in the file of this patent

UNITED STATES PATENTS

| | | |
|---|---|---|
| 1,623,204 | Peirce | Apr. 5, 1927 |
| 1,688,539 | Fischer | Oct. 23, 1928 |
| 1,843,986 | Peirce | Feb. 2, 1932 |
| 1,950,187 | Mansel | Mar. 6, 1934 |
| 2,374,790 | Terry | May 1, 1945 |
| 2,757,866 | Johnson | Aug. 7, 1956 |
| 2,792,275 | Drillick et al. | May 14, 1957 |

FOREIGN PATENTS

| | | |
|---|---|---|
| 548,956 | Belgium | July 14, 1956 |
| 845,545 | Great Britain | Aug. 24, 1960 |